(12) United States Patent
Gomez et al.

(10) Patent No.: US 10,604,049 B2
(45) Date of Patent: Mar. 31, 2020

(54) VEHICLE SEAT HEADREST WITH LEVER RELEASE

(71) Applicant: Adient Luxembourg Holding S.à r.l., Luxembourg (LU)

(72) Inventors: John Gomez, Howell, MI (US); James Biebel, Milford, MI (US); Tyler Rusnak, Saint Charles, IL (US); David Hayes, West Bloomfield, MI (US); Patrick Donnelly, Brighton, MI (US); Srinivasa N Sanku, Northville, MI (US)

(73) Assignee: Adient Luxembourg Holding S.à r.l., Luxembourg (LU)

( * ) Notice: Subject to any disclaimer, the term of this patent is extended or adjusted under 35 U.S.C. 154(b) by 46 days.

(21) Appl. No.: 16/075,193

(22) PCT Filed: Feb. 3, 2017

(86) PCT No.: PCT/US2017/016446
§ 371 (c)(1),
(2) Date: Aug. 3, 2018

(87) PCT Pub. No.: WO2017/136684
PCT Pub. Date: Aug. 10, 2017

(65) Prior Publication Data
US 2019/0039491 A1 Feb. 7, 2019

Related U.S. Application Data

(60) Provisional application No. 62/290,660, filed on Feb. 3, 2016.

(51) Int. Cl.
*B60N 2/80* (2018.01)
*B60N 2/815* (2018.01)
*B60N 2/844* (2018.01)
*B60N 2/865* (2018.01)
*B60N 2/818* (2018.01)

(52) U.S. Cl.
CPC ............... *B60N 2/815* (2018.02); *B60N 2/80* (2018.02); *B60N 2/818* (2018.02); *B60N 2/844* (2018.02); *B60N 2/865* (2018.02)

(58) Field of Classification Search
CPC .......... B60N 2/80; B60N 2/806; B60N 2/815; B60N 2/809; B60N 2/818; B60N 2/844; B60N 2/865

(Continued)

(56) References Cited

U.S. PATENT DOCUMENTS 10,427,573 B2 * 10/2019 Ishihara ................. B60N 2/829
2007/0096515 A1 * 5/2007 Jammalamadaka ... B60N 2/844
297/216.12

(Continued)

FOREIGN PATENT DOCUMENTS

EP 0317726 A2 * 5/1989 ........... A47C 27/086
WO 2013/158580 A2 10/2013

*Primary Examiner* — Ryan D Kwiecinski
(74) *Attorney, Agent, or Firm* — Marshall & Melhorn, LLC

(57) ABSTRACT

A vehicle headrest includes a carriage with support rods, an outer headrest connected to the carriage, a vertical locking arrangement with a locking element having a locked state and a released state relative to a support rod locking interface. Release levers, accessible from respective sides, move essentially along a vehicle direction of travel. Release carriers, moveably mounted to the carriage, moves essentially along a vehicle inboard/outboard direction and moves the locking element into the released state. Each release linkage activates the movement of the release carrier. The headrest also includes a forward and rearward locking arrangement for movement of the outer headrest relative to the carriage with support rods with at least some forward and/or rearward movement component. The movement arrangement, for movement of the outer headrest relative to the carriage, (Continued)

does not interrupt the release linkage connection for activating the movement of the release carrier.

20 Claims, 10 Drawing Sheets

(58) Field of Classification Search
USPC .................................................. 297/391, 410
See application file for complete search history.

(56) References Cited

U.S. PATENT DOCUMENTS

| | | | |
|---|---|---|---|
| 2007/0164593 A1* | 7/2007 | Brockman | B60N 2/847 297/408 |
| 2007/0267908 A1* | 11/2007 | Watanabe | B60N 2/818 297/410 |
| 2009/0102266 A1* | 4/2009 | Furukawa | B60N 2/20 297/391 |
| 2009/0134683 A1* | 5/2009 | Furukawa | B60N 2/206 297/391 |
| 2010/0187879 A1* | 7/2010 | Brandl | B60N 2/2851 297/250.1 |
| 2011/0254339 A1* | 10/2011 | Bruck | B60N 2/844 297/403 |
| 2011/0291456 A1 | 12/2011 | Poehlmann et al. | |
| 2014/0327288 A1 | 11/2014 | Groenninger et al. | |
| 2016/0107553 A1* | 4/2016 | Imajo | B60N 2/68 297/452.18 |
| 2016/0250952 A1* | 9/2016 | Sasaki | B60N 2/815 297/410 |
| 2017/0291516 A1* | 10/2017 | Tat | B60N 2/885 |
| 2018/0065523 A1* | 3/2018 | Soltner | B60N 2/818 |

* cited by examiner

VEHICLE SEAT HEADREST WITH LEVER RELEASE

CROSS REFERENCE TO RELATED APPLICATIONS

This application is a U.S. National Stage application of PCT/US2017/016446, filed on Feb. 3, 2017 which claims the benefit of priority of U.S. provisional application 62/290,660, filed Feb. 3, 2016, the entire contents of which are incorporated herein by reference.

FIELD OF THE INVENTION

The present invention relates to vehicle seats and more particularly to a vehicle seat headrest with release mechanisms for adjusting a position of the headrest.

BACKGROUND OF THE INVENTION

Vehicle seat headrests are provided that include two-way adjustment—essentially up and down vertical (z-direction) movement with respect to support rods and four-way adjustment—vertical (z-direction) adjustment as well as forward and rearward (x-direction) adjustment relative to the support rods. Additionally, configurations with two-way and/or four-way adjustment may be provided with tilt adjustment. The various configurations may include a release mechanism to change the headrest from a fixed position relative to the support rods into a released state, wherein any one of the various adjustments may be made. The arrangements may include a release pushbutton, at one side of the exterior of the headrest. The release pushbutton triggers the released state of the release mechanism.

For manufacturing purposes, it is advantageous to manufacture one or few types of headrests. This results in the push button release actuator being on the same side of the body of the headrest. In a vehicle, this may result in, for example, the release pushbutton being on the vehicle inboard side for the driver seat headrest and being on the vehicle outboard side on the passenger seat headrest.

SUMMARY OF THE INVENTION

It is an object of the invention to provide a vehicle headrest for two-way, four-way and/or tilt headrest adjustment which can be actuated from each side of the headrest for actuating the release state.

It is another object of the invention to provide a headrest release actuator in the form of the release lever for ease of actuation. In particular it is an object to provide a release lever with a forward and rearward (x-direction) actuation direction of operation relative to the vehicle to provide ease of actuation.

It is still a further object of the invention to provide a vehicle headrest that is simple in design, rugged in construction and economical to manufacture.

According to the invention, a vehicle headrest is provided comprising a carriage with support rods connected to the carriage. An outer headrest is provided outwardly of the carriage. This may be a headrest front cover and a headrest rear cover that are connected together to form an outer headrest. The outer headrest is connected to the carriage. The headrest further comprises a vertical locking arrangement connected to the carriage. The vertical locking arrangement comprises a support rod locking interface, such as grooves formed in the rods and a locking element, such as a locking wire, having a locked state and a released state relative to the support rod locking interface. A release lever is accessible from an exterior of the headrest. The release lever moves with a lever release motion in a lever release direction that is essentially along a vehicle direction of travel. A release carrier is moveably mounted to the carrier and moves essentially along a vehicle inboard/outboard direction between a lock position and a release position. The release carrier supports (carries) the locking wire and in the release position the locking wire is moved into a released state. A release linkage connects the release lever to the locking interface and transmits the lever release motion to the release carrier. The movement of the release lever in the lever release direction moves the release carrier in the inboard/outboard direction to the release position to release the locking wire from the locking interface.

The release lever may be a part of a release lever assembly comprising a bezel part with an annular rim and central portion defining a lever guide and a lever biasing means for biasing the lever into a locked position. The lever may be mounted to the bezel part for guided movement between the locked position and a release position. The lever guide may comprise guide rails for guided movement of the slot follower and the lever between the locked position and a release position and/or a slot receiving a slot follower that is attached to the lever for guided movement of the slot follower and the lever between the locked position and a release position. The guide rails may be a part of or connected to the bezel part or tacks may be provided. Instead of a separate bezel part the guides or tracks may be supported by the outer headrest covers. The rails or tracks may be part of a low profile guide system, such as formed of aluminum profiles that are fixed to the outer headrest or housing. The lever may have complementary carriages that made of chromated zinc or plastic. The lever guide may instead comprise a pivot pivotably mounting the lever for pivoting movement of the lever between the locked position and the release position.

The release linkage may comprise a pivotably mounted paddle acting on the release carrier in the vehicle inboard/outboard direction and a wedge arrangement between the lever and the paddle. The wedge arrangement transmits the motion of the lever in the lever release direction into motion of the paddle in the vehicle inboard/outboard direction. The paddle may be pivotably mounted to the outer headrest and move with the outer headrest relative to the carriage and carrier. The paddle has a sufficient extent (contact surface) in the headrest front to back direction such that it engages and acts on the carrier in all positions of the headrest relative to the carriage, on which the carrier is mounted.

The vehicle headrest may advantageously include a forward and rearward locking arrangement connected to the carriage and the outer headrest. The locking arrangement may comprise a latch having a locked state and a released state. The carriage may be movably mounted relative to the outer headrest (the headrest front cover and the headrest rear cover). The latch may be connected to carriage and may be actuated by movement of the release carrier. The movement of the release lever in the lever release direction moves the release carrier in the inboard/outboard direction to the release position to move the latch from the locked state to the released state. In the released state the carriage is movably mounted relative to the headrest front cover and the headrest rear cover for movement in a forward and rearward direction that is linear or changes a tilt angle of the headrest front cover and the headrest rear cover.

The vehicle headrest may further comprise a second side release lever that is accessible from a second side of the exterior of the headrest. The second side release lever moves with a second lever release motion in a second lever release direction essentially along the vehicle direction of travel. A second side release linkage may be provided comprising a pivotably mounted second side paddle moving in the vehicle inboard/outboard direction from a rest position to a release position and a second side wedge arrangement between the lever and the paddle for transmitting motion of the lever in the lever release direction into motion of the paddle in the vehicle inboard/outboard direction.

The second side release linkage may further comprise a complementary mechanism, connecting the second side paddle to the release carrier and transmitting the second side release lever release motion to the release carrier. The movement of the second side release lever in the second side lever release direction moves the release carrier in the vehicle inboard/outboard direction to the release position to release the locking element from the locking interface. The movement of the release carrier to the release position is in a direction that is essentially opposite to the direction of movement of the second side paddle, from the rest position to the release position.

The complementary mechanism may comprise an arm extension connected to the pivotably mounted second side paddle. The second side paddle acts on the arm extension in the vehicle inboard/outboard direction. A pivot carrier with a pivot support is provided, wherein the pivot carrier is connected to the carriage. The complementary mechanism further includes a pivot arm with a pivot joint connecting the arm extension to the pivot arm. The pivot arm is pivotably mounted to the pivot support and has a drive linkage end connected to the release carrier. The second release linkage connects the second release lever to the release carrier and transmits the second lever release motion to the release carrier. The movement of the second release lever along the direction of travel moves the release carrier in the inboard/outboard direction to release the locking element from the locking interface.

The second side release lever may also release the forward and rearward locking arrangement. The second release linkage connects the second release lever to the release carrier and transmits the second lever release motion to the release carrier, whereby movement of the second release lever along the direction of travel moves the release carrier in the inboard/outboard direction to the release position to move the latch from the locked state to the released state. In the released state the carriage is movably mounted relative to the headrest front cover and the headrest rear cover for movement in a forward and rearward direction that is linear or changes a tilt angle of the headrest front cover and the headrest rear cover.

According to another aspect of the invention, a vehicle headrest is provided comprising a carriage with support rods connected to the carriage. A headrest front cover and a headrest rear cover are connected together to form an outer headrest. The outer headrest is connected to the carriage. The headrest further comprises a vertical locking arrangement connected to the carriage. The vertical locking arrangement comprises a support rod locking interface and a locking wire having a locked state and a released state relative to the support rod locking interface. A first side release lever is accessible from a first side of an exterior of the headrest. The first side release lever moves with a first lever release motion in a lever release direction essentially along a vehicle direction of travel. A release carrier is moveably mounted to the carriage and moves essentially along a vehicle inboard/outboard direction and moves the locking wire into the released state. A first side release linkage connects the release lever to the locking interface and transmits the lever release motion to the release carrier, whereby movement of the release lever along the direction of travel moves the release carrier in the inboard/outboard direction to release the locking wire from the locking interface. A second side release lever is accessible from a second side of the exterior of the headrest. The second side release lever moves with a lever release motion in a lever release direction essentially along a vehicle direction of travel. A second side release linkage comprises an extension arm pivotably connected to a pivot arm. A pivot carrier with a pivot, is connected to the carriage. The pivot arm is pivotably connected to the pivot carrier for pivoting at the pivot. The pivot arm is connected to the release carrier. The second side release linkage connects the second release lever to the release carrier and transmits the second lever release motion to the release carrier, whereby movement of the second release lever along the direction of travel moves the release carrier in the inboard/outboard direction to release the locking wire from the locking interface.

It is apparent that the above-described features, which will also be explained below, can be used not only in the particular combination described, but also in other combinations or alone, without going beyond the scope of the present invention.

Preferred exemplary embodiments of the present invention are shown in the drawings and will be explained in more detail in the following description, where identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
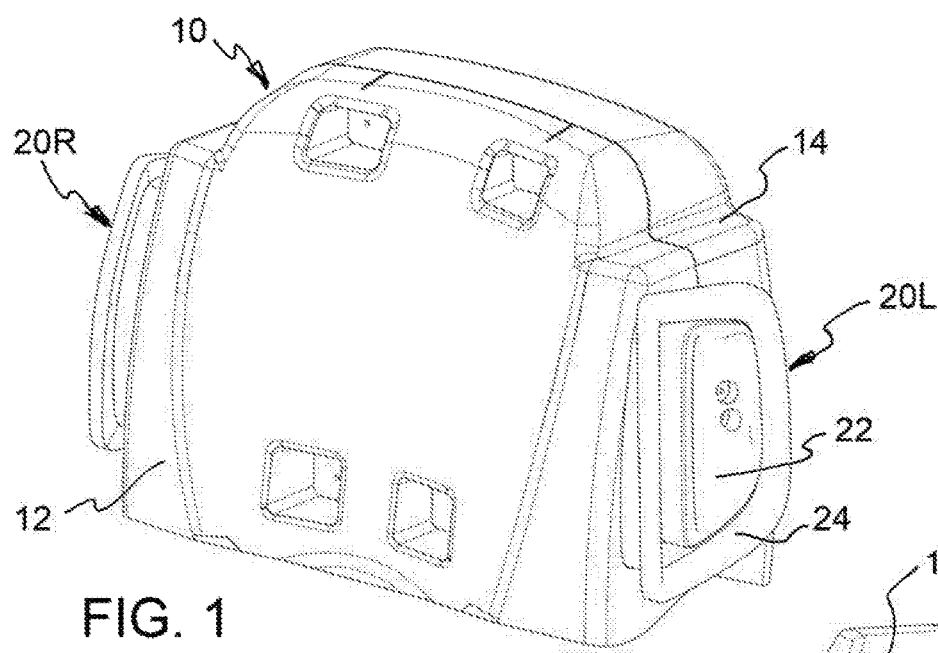
FIG. 1 is a front perspective view of a headrest according to the invention with the rods removed.
Figure 11:
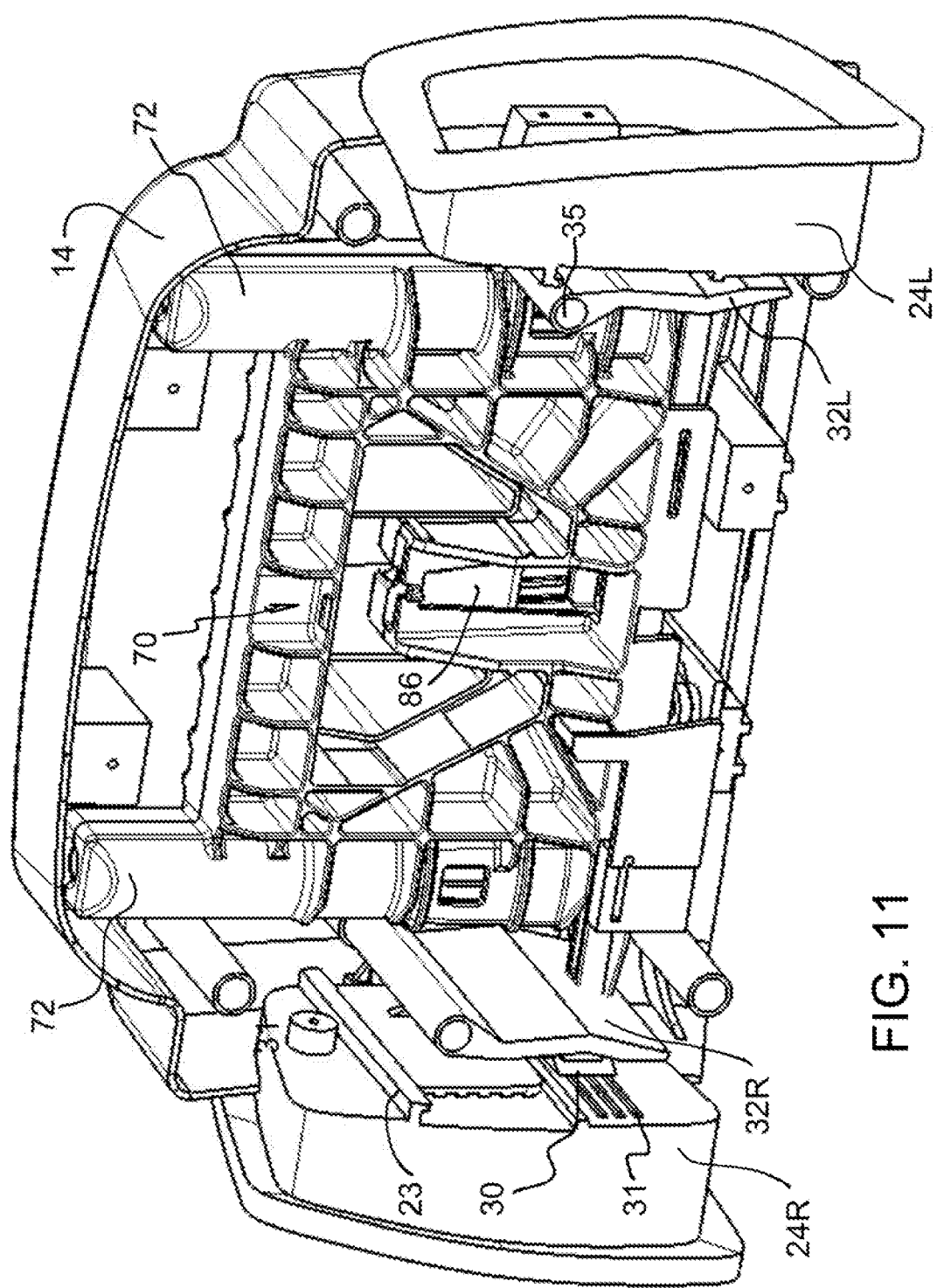
FIG. 11 is a front perspective view of the headrest, with the front cover removed and the carriage shown partially cut away.
Figure 12:
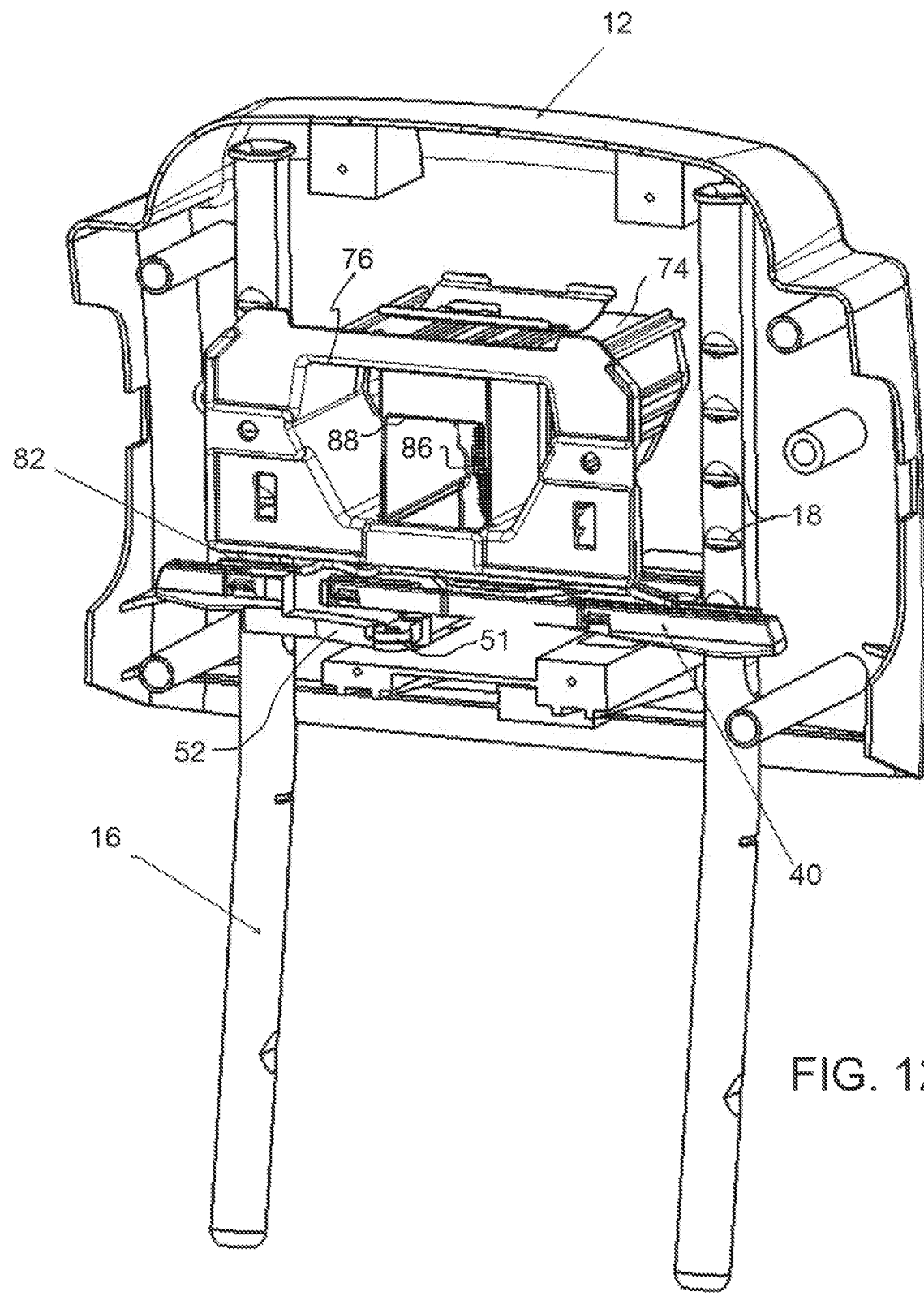
FIG. 12 is a rear perspective view of the headrest, with the rear cover removed, and the carriage removed and showing the position of the rods relative to the front cover.
Figure 13:
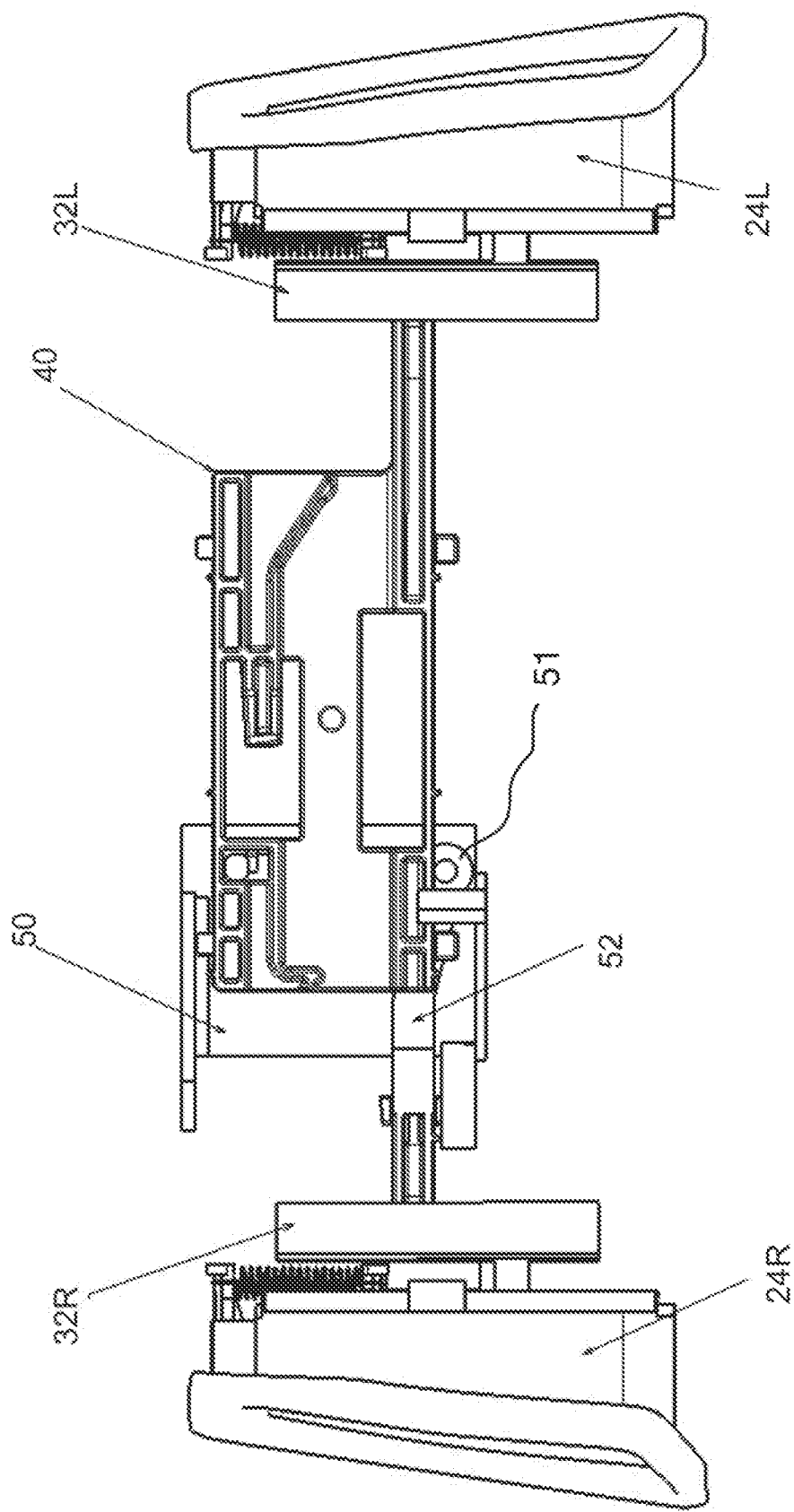
FIG. 13 is a top partial view showing the connections of the lever assemblies to the carrier and the pivot carrier.

Referring to the drawings, FIG. 1 shows a headrest generally designated 10 that includes an outer headrest that comprises a housing or outer headrest, with a front cover 12 and a rear cover 14. The headrest 10 also includes support rods 16. Each of the support rods 16 includes a support rod locking interface 18 in the form of notches that receive a locking element (locking/release wire) 82 (FIG. 12). The headrest also comprises a carriage 70 with rod receiving portions 72 (FIG. 11).

Figure 10:
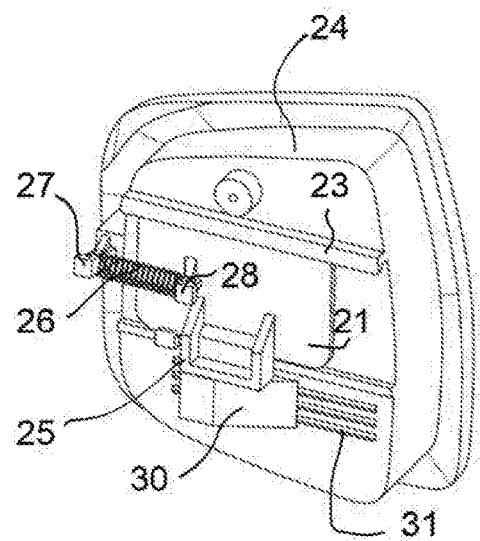
FIG. 10 is a rear perspective view of the lever assembly.

The headrest further comprises a lever assembly 20 on each of the left and right side. Each lever assembly 20 has the same design and configuration and includes a lever 22 and a bezel part 24. The bezel part 24 includes an opening with adjacent upper and lower guide rails 23 that receive a guide slot follower 21. The guide rails and the guide slot follower 21 form a part of a lever guide. The guide slot follower 21 is fixed to or is an integral part of the lever 22 (FIG. 10). The bezel part 24 also includes a bezel spring support 27. The guide slot follower 21 includes a lever spring support 28. A spring 26 is attached to the bezel spring support 28 and is also attached to the lever spring support 28 of the lever 22. The lever 22 is biased by the spring arrangement, with spring 26, into a locked or rest position. As an alternative, the lever 22 may have upper and lower track parts that each slide in a complementary track. Each complementary track is fixed to the outer housing 12, 14.

A slide tab 25 is fixed to the lever 22. The slide tab 25 supports a lever wedge 30. The lever wedge 30 includes a guide interface that interacts with a wedge guide track 31 and is guided along the wedge guide track 31. The wedge guide track 31 is formed on an inner surface of the bezel part 24. The lever wedge 30 has a wedge surface on a side opposite to the guide interface.

The headrest 10 advantageously includes a dual release arrangement, with a release lever assembly 20 at each side. The release lever assembly 20 cooperates with a paddle 32, connected to the carriage 70, at each side. The left and right side paddles 32, with associated paddle wedge 33 may be identical such that the same reference numeral is mostly used. In several of the Figures, the designation R, for right side of the headrest 10 and L for left side of the headrest 10 is added to some reference characters to clearly indicate the orientation of the left and right side in the particular view.

Figure 3:
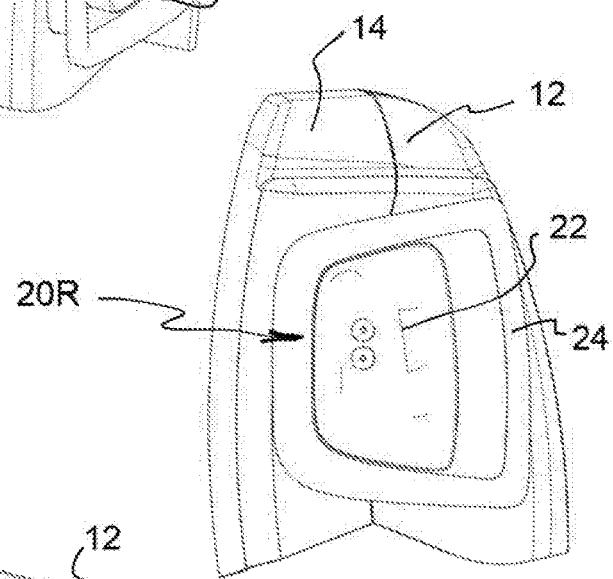
FIG. 3 is a right side partially cutaway view of the headrest with the rods removed.
Figure 2:
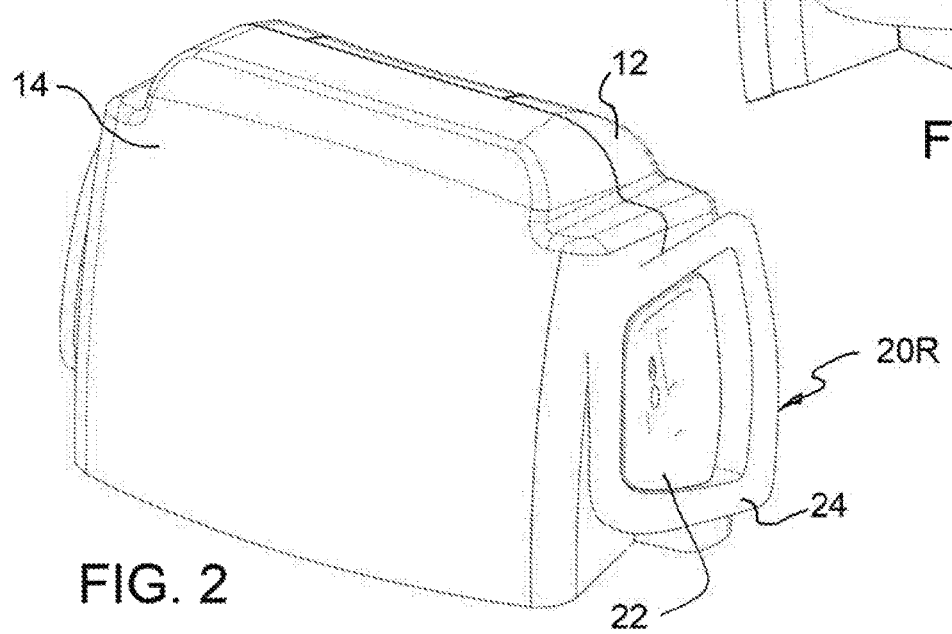
FIG. 2 is a rear perspective view of the headrest with the rods removed.

The release lever 22 is accessible from an exterior of the headrest as shown in FIGS. 1, 2 and 3. The release lever 22 moves from the rest position, with a lever release motion, in a lever release direction. This release motion is along a forward-rearward direction—essentially along a vehicle direction of travel or x-direction. Advantageously, the release direction for each of the right lever 22R of the right lever assembly 20R and the left lever 22L of the left lever assembly 20L is in the forward direction with respect to the vehicle direction of travel. However, there may be some advantages to the release direction being in the rearward direction with respect to the vehicle direction of travel. Both of the release directions are possible and the same headrest may have a right lever 22R with a release direction which is opposite to that of an associated left lever 22L.

Figure 4:
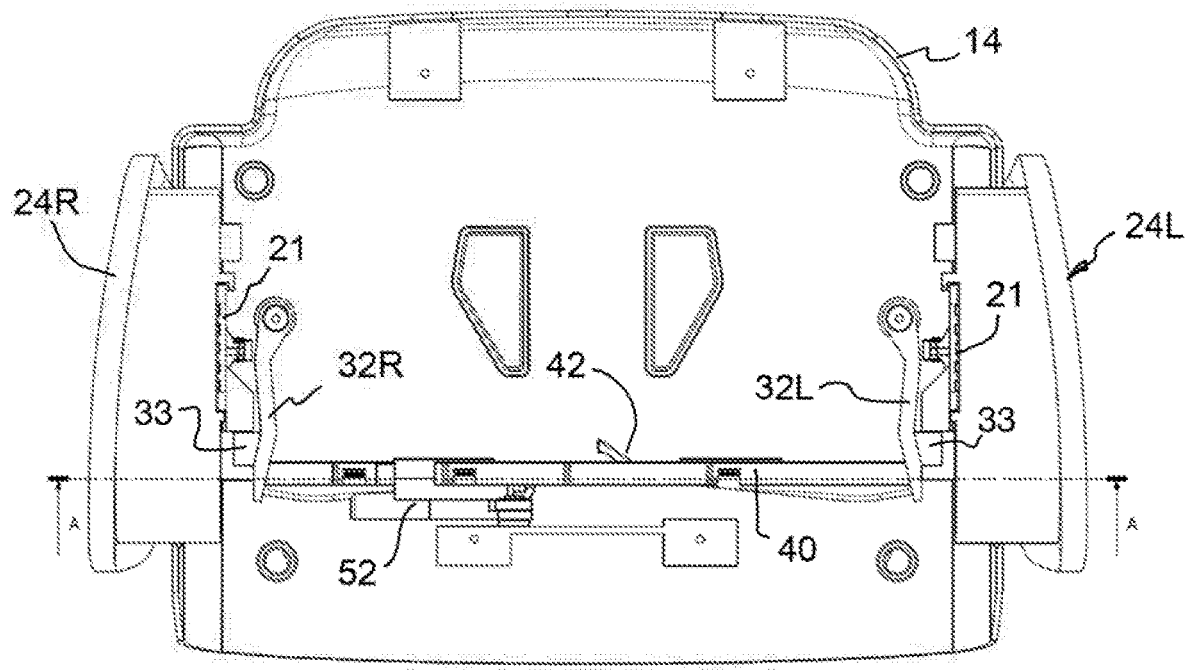
FIG. 4 is a front view of the headrest with the front cover, the rods and the carrier removed.
Figure 5:
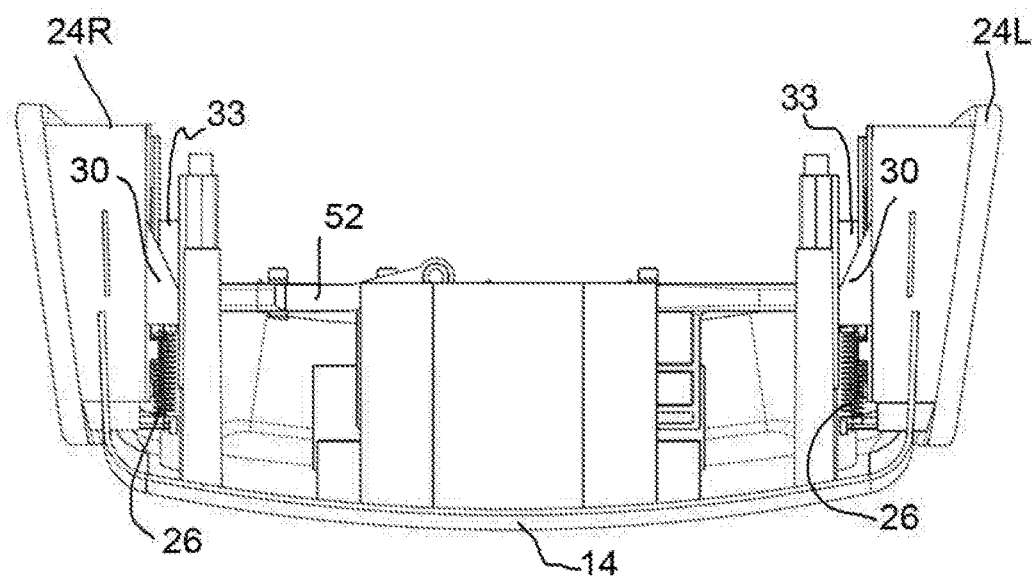
FIG. 5 is a bottom view of the headrest with the front cover, the rods and the carrier removed.
Figure 6:
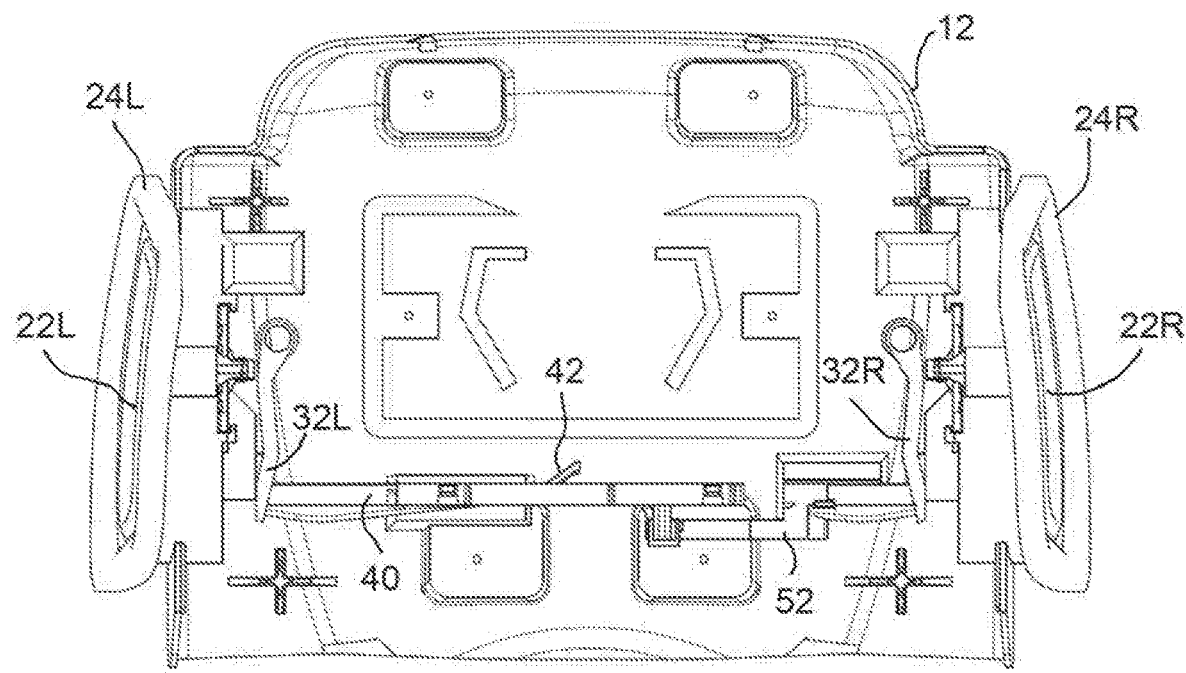
FIG. 6 is a rear view of the headrest with the rear cover, the rods and the carrier removed.

As can be seen in FIG. 4, each paddle 32 is pivotably supported at paddle pivot 35 by the outer headrest (by one or both of the front cover 12 and the rear cover 14). The paddle 32 includes a paddle wedge 33 with a wedge surface. The wedge surface of the paddle 32 interacts with the lever wedge 30. The movement of the lever 22 moves the wedge surface of the lever wedge 30 relative to the wedge surface a paddle wedge 33. This transmits a sliding motion of the release lever 22, along the forward-rearward direction—the lever release direction (x-direction), to a pivoting movement of the paddle 32. The motion of the lever 22 moves the paddle 32 so as to pivot the paddle 32, at pivot 35, inwardly (relative to the headset).

At the left side of the head rest 10, the paddle 32L is in contact with a slidably mounted release carrier 40. The release carrier 40 mounted moveably to the carriage 70 and is moveable laterally relative to the headset or in the inboard/outboard direction of the vehicle (side to side direction). The inward movement of the paddle 32L with inward movement of the release carrier 40 causes the release carrier 40 to interact with the locking/release wire 82. In particular the locking/release wire 82 is carried by the release carrier 40 and movement of the release carrier 40 to a release position causes the locking/release wire 82 to move such that at least ends of the release wire 82 move out of engagement in the respective receiving slots of the locking interface 18.

A left side or a first release linkage is formed by the pivotably mounted paddle 32L acting on the release carrier 40 in the vehicle inboard/outboard direction. The first side release linkage includes the wedge arrangement with lever wedge 30 and paddle wedge 33 between the lever 22L and the paddle 32L. The first side release linkage transmits a forward-rearward motion—x-direction motion—of the lever 22L (in the lever release direction) to an inward (relative to the headrest) motion of the paddle 32L and to an inward motion of the release carrier along the vehicle inboard/outboard direction (y-direction). The movement of the paddle 32 inwardly pushes a release carrier 40 inwardly—along the inboard/outboard direction of the vehicle (side to side direction of the headrest)—to a release position. The release carrier 40 may be spring biased relative to the carriage so as to return to the locked or rest position. The connection of the left paddle 32L to the release carrier 40 allows the outer headrest (the front cover 12 and the rear cover 14) that carries the paddle 32 to move (e.g., for forward or rearward adjustment) relative to the carriage 70, rods 16 and carrier 40 without interfering with the transmission of motion from the lever 22 to the carrier 40. In particular, each paddle 32 has an engagement surface which moves to move a cooperating part but allows the cooperating part two slide along the engagement surface with the adjustment of the outer headrest relative to the carriage 70. In the case of the left paddle 32L, the engagement surface of the left panel 32L is always in contact with a contact portion of the carrier 40, in all adjustment positions of the outer headrest relative to the carriage 70.

The carriage 70 is movably mounted relative to the headrest front cover 12 and the headrest rear cover 14. The movement includes at least some forward and rearward direction (x-direction) component. This movement may be a linear forward and backward movement of the outer headrest relative to the carriage 70 and rods 16 or it may be a change in a tilt angle of the outer headrest relative to the carriage 70 and rods 16. The tilt angle change may also include some x-direction movement. A cartridge 72 is fixedly connected to the outer headrest—the headrest front cover 12 and the headrest rear cover 14 (FIG. 11). A portion of the carriage 70 is mounted relative to the cartridge 72 in a region formed at flange 76 of the cartridge 72. The connection of the carriage 70 with the cartridge 72 and the outer headrest—the headrest front cover 12 and the headrest rear cover 14—includes a forward and rearward locking arrangement. The forward and rearward locking arrangement comprises a latch 86 having a locked state and a released state. The latch 86 is connected to carriage 70 and is actuated by movement of the release carrier 40. The release of the cartridge 72 relative to the carriage 70 allows the outer headrest—the headrest front cover 12 and the headrest rear cover 14—to move in the forward and rearward direction (x-direction), and/or tilt, relative to the carriage 70 and rods 16 to some degree. The cartridge 72 has a forward/rearward release latch receiving catch surface region 88 that is engaged by the latch 86 carried by the carriage 70. The latch 86 has a locked state and a released state. The movement of the carrier 40, upon movement of the left side lever 22L, moves a latch release element 42, of the carrier 40, such that latch release element 42 interacts with the release latch 86 to move the release latch to a released state. This releases the outer headrest—the headrest front cover 12 and the headrest rear cover 14—for forward-rearward movement relative to the carrier 70 and the rods 16.

Figure 7:
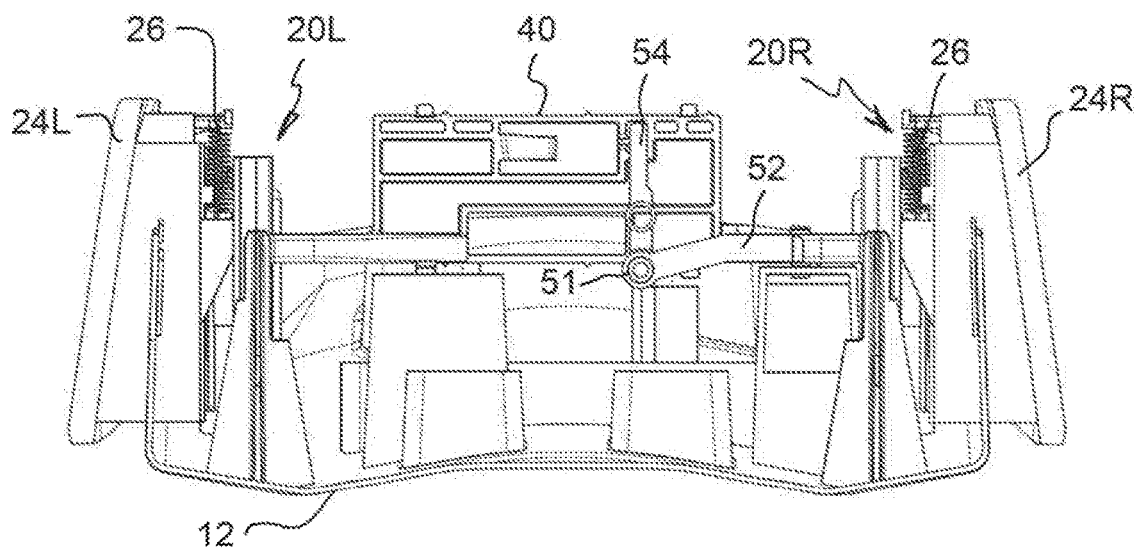
FIG. 7 is a bottom view of the headrest with the rear cover, the rods and the carrier removed.
Figure 8:
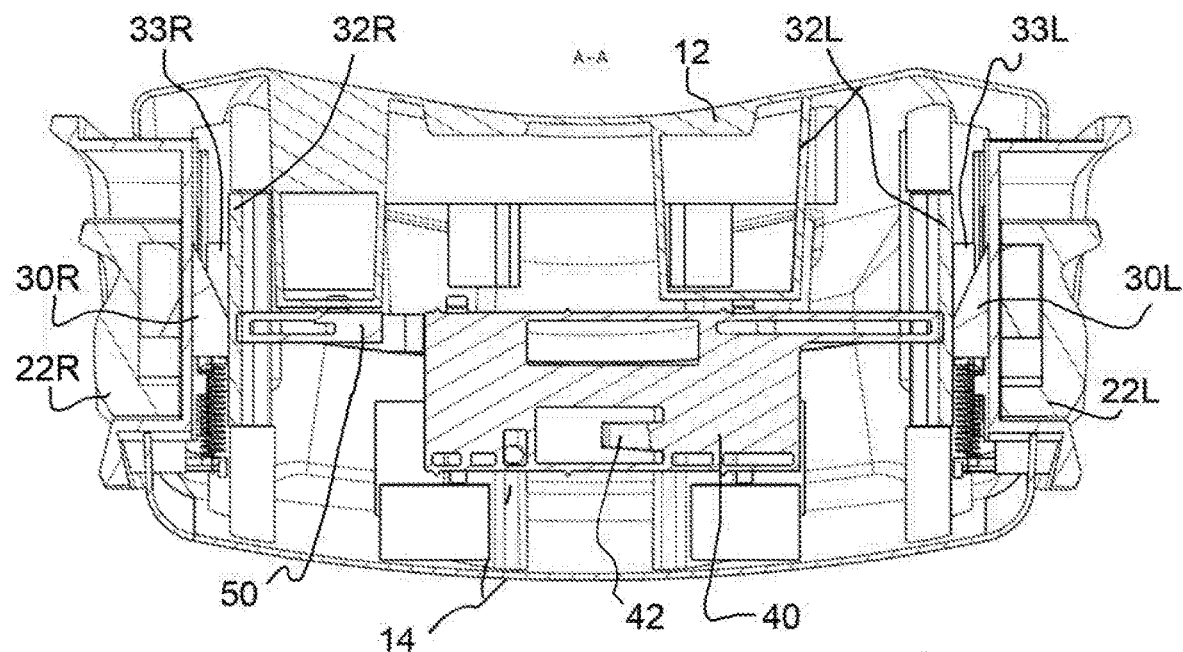
FIG. 8 is a cross-sectional view of the headrest taken at the location of line A-A of FIG. 5 and showing the front cover and the rear cover with the rods and the carrier removed.
Figure 9:
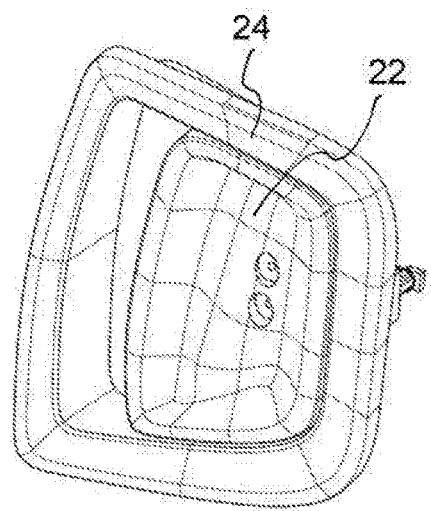
FIG. 9 is a front perspective view of the lever assembly.
Figure 14:
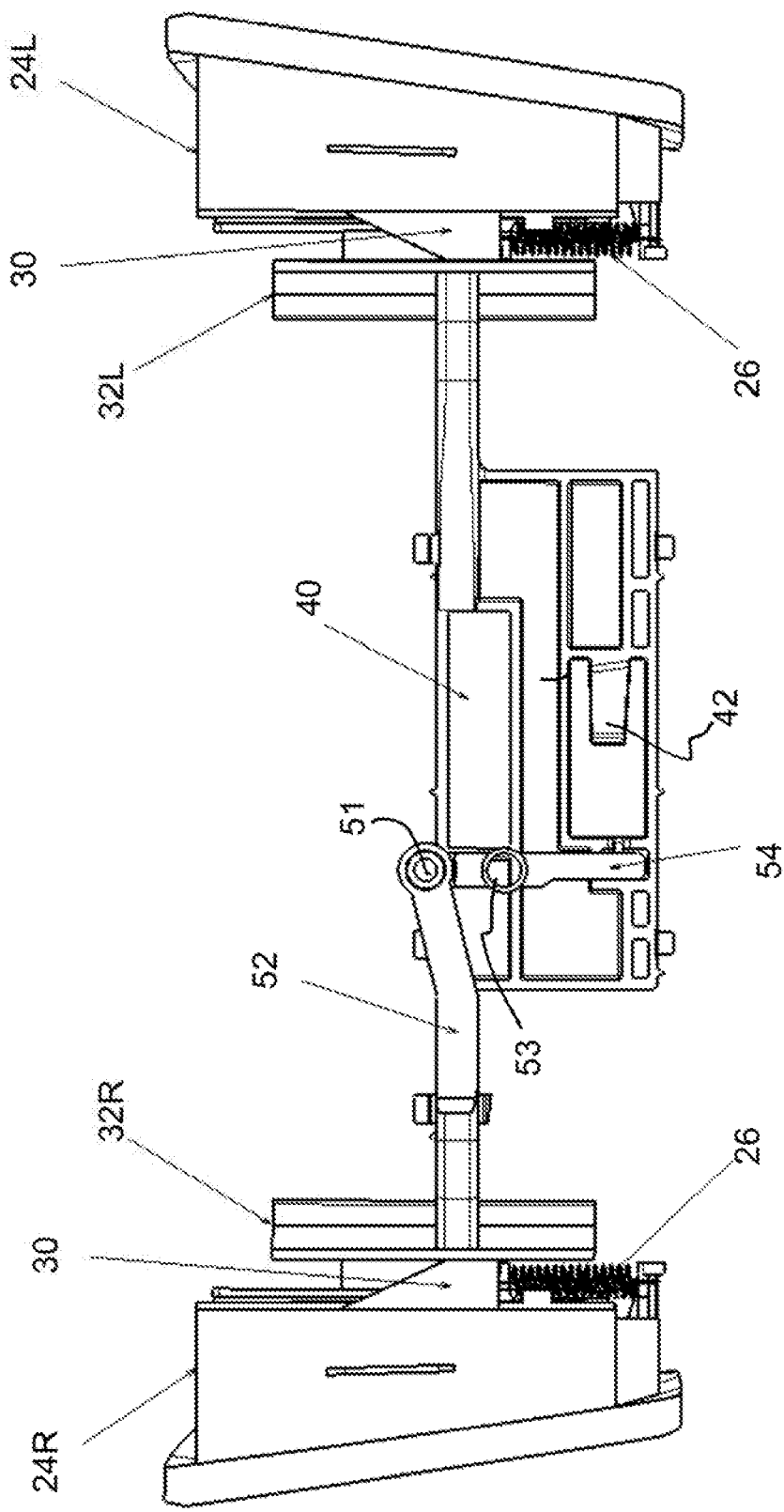
FIG. 14 is a bottom partial view showing the connections of the lever assemblies to the carrier, with the pivot carrier removed.

At the right side of the head rest 10, the contact surface of the paddle 32R is in contact with complementary mechanism, that translates motion of the panel 32 are to the same motion of carrier 40 that is produced by actuating the left side lever 22L. The complementary mechanism includes an arm extension 52. The paddle 32R is in contact with a contact surface of the arm extension 52. The arm extension 52 moves with the paddle 32R inwardly relative to the headset 10—in the inboard/outboard direction of the vehicle (the lateral or side to side direction of the headrest). The contact between the surface of paddle 32R and the arm extension 52 allows the contact of the arm extension 52 to shift along the surface of the paddle 32R during adjustment with the forward and rearward locking arrangement. The arm extension 52 is connected via a pivot joint connection 51 to a pivot arm 55. The pivot arm 55 is pivotably mounted to a pivot carrier 50 at pivot connection 53. The pivot carrier 50 is mounted to the carriage 70. The pivot arm 55 has a drive link end 54 that is connected to a slot in the carrier 40 with a tolerance (FIGS. 7 and 14). The drive link or drive link end 54 is rotationally, fixedly connected to or integrally formed with the pivot arm 55 so as to pivot with the pivot arm 55 about pivot connection 53. The linkage arrangement of the complementary mechanism, with the arm extension 52, the pivot carrier 50, with pivot connection 53, the pivot arm 55 with pivot connection to the arm extension and driving the drive link 54 for movement about the pivot connection 53, causes the carrier 40 to be moved inwardly (from the right side) upon movement of the arm extension 52 inwardly (from the left side). This occurs when the lever 22R is moved to the release position. This causes paddle 32R to pivot, pushing the arm extension 52 inwardly (from right toward left in FIG. 7). The pivot joint connection 51 of the arm extension 52 is connected with pivot arm 55. With this connection the inward movement of the arm extension 52 causes the arm pivot 55 to pivot about pivot 53 of the pivot carrier 50 and move the drive link 54. The pivoting of the drive link 54 causes the carrier 40 to move to the release position. With this arrangement, the movement of the right side lever 22R to a release position moves the carrier 40. This movement of the right side lever 22R to the release position is in the same forward direction as the movement of the left side lever 22L to the release position. However, either the forward or the rearward direction of movement are possible. In each case of the lever movement and from each side, the carrier 40 is moved inwardly in the vehicle inboard/outboard direction from the same rest position to the same release position. The linkage 50, 51, 52, 54, 55 and the connection of the drive link 54 with the carrier 40 form the complementary mechanism. The linkage 50, 51, 52, 54, 55, the paddle 32R and the wedge arrangement 30, 33 between the lever 22R and the paddle 32R form a right side or second release linkage.

Instead of providing the connection between the release carrier 40 and the drive link 54 with sufficient tolerance that allows the pivoting movement of the drive link 54 to result in linear movement of the release carrier 40, another connection may be provided. For example, the end of the arm pivot at 54 may have a post that extends into a slot formed in the release carrier 40. The movement of the end of the arm pivot at 54 then causes the post to move along the slot, causing the linear movement of the release carrier 40. The complementary mechanism may be formed by other arrangements including gearing and combinations of links, pivots and gears.

The movement of the release carrier 40, upon movement of the right side lever 22R interacts with the release latch 86 as described above. Also as noted above, the movement of the release carrier 40 to a release position causes the locking/release wire 82 to move such that at least ends of the locking/release wire 82 move out of engagement in the respective receiving slots of the locking interface 18.

Figure 16:
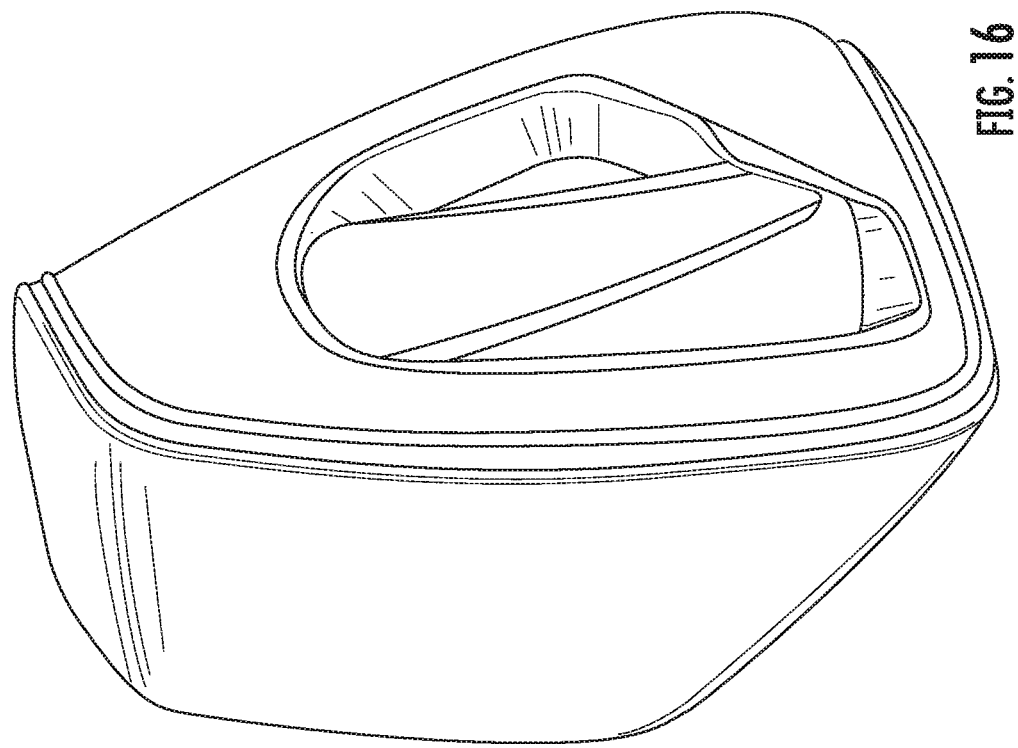
FIG. 16 is a perspective view showing another lever configuration embodiment.
Figure 15:
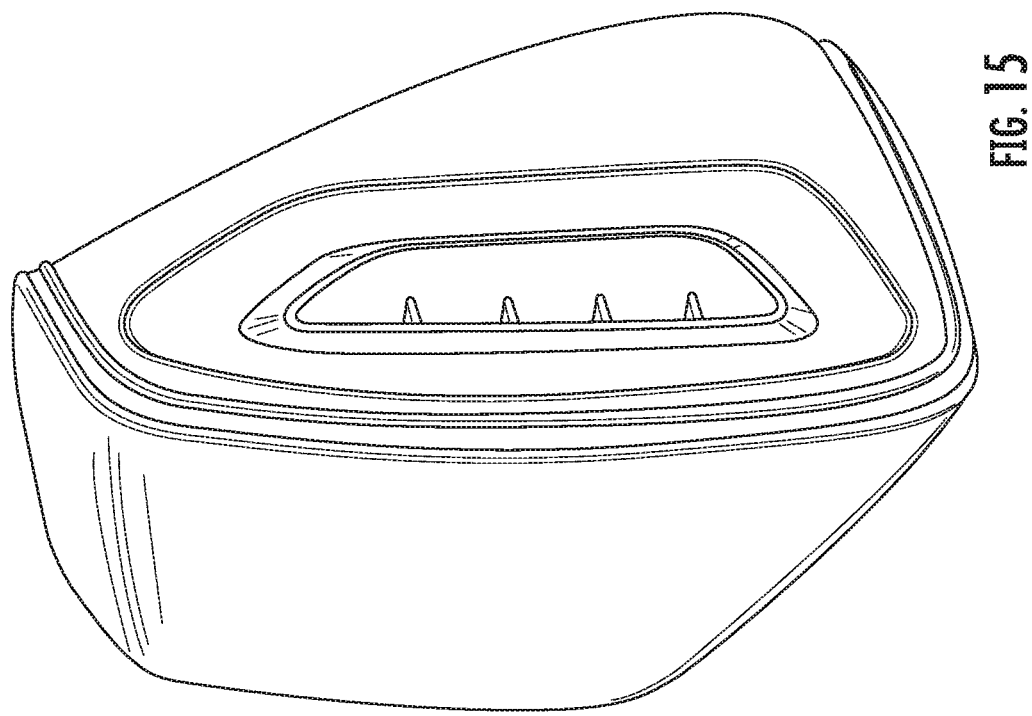
FIG. 15 is a perspective view showing a lever configuration embodiment.
Figure 18:
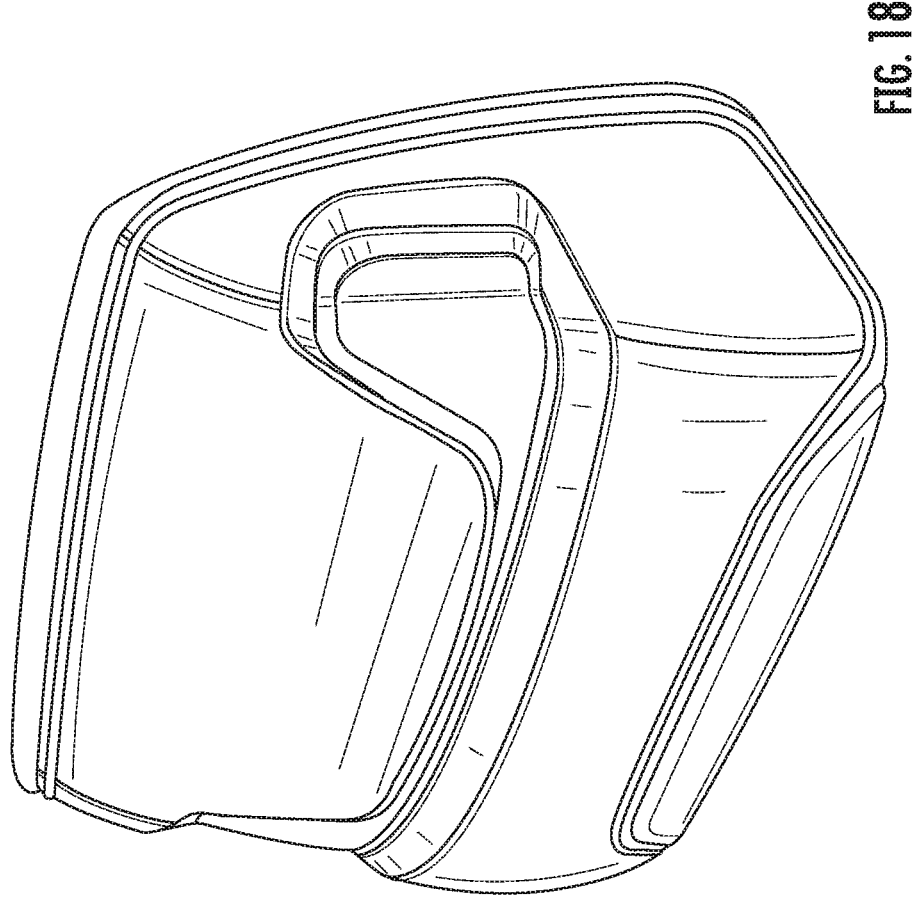
FIG. 18 is a perspective view showing another lever configuration embodiment.
Figure 17:
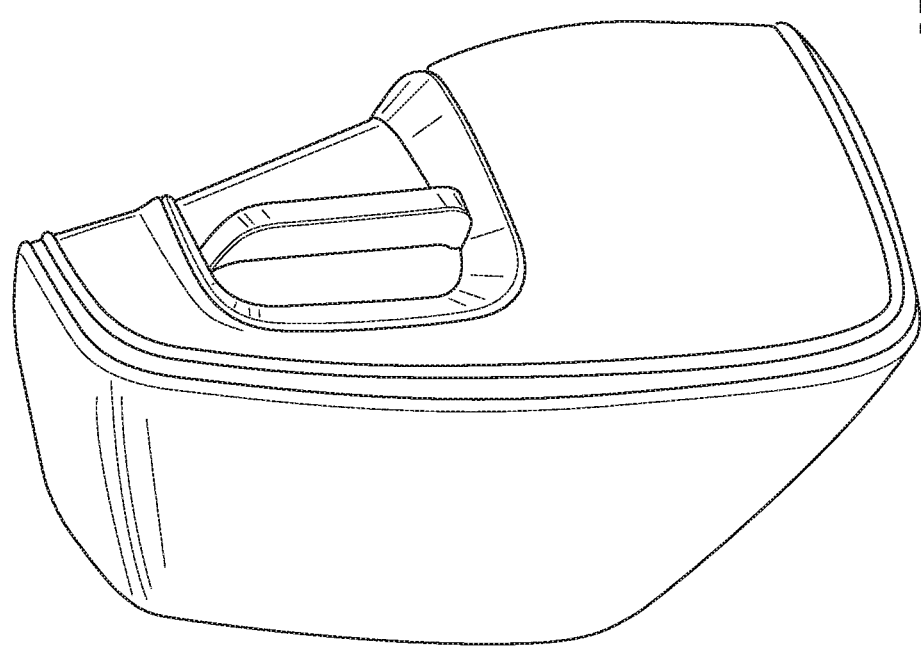
FIG. 17 is a perspective view showing another lever configuration embodiment.

FIGS. 15-18 show various design concepts based on the above described dual side release lever features. The designs of FIGS. 15, 17 and 18 provide levers that cooperate with a linear guide arrangement. The levers are supported and guided to be moved along lever guides such as tracks or rails for essentially linear movement in a lever release direction, between a rest position and a release position. Instead of the release lever 22 being mounted to move linearly along the lever guide in the lever release direction, the lever 22 may instead be pivotably mounted to the bezel 24 or to the outer headrest as shown in FIG. 16. In this case the release lever 22 still moves from the rest position, with a lever release motion, in a lever release direction to a release position. This release motion is essentially along a forward-rearward direction—essentially along a vehicle direction of travel or x-direction—along an arc. The wedge 30 is again movable on the track 31. An interconnection between the wedge 30 and the release lever 22 is such that the pivoting of the lever 22 results in a sliding movement of the wedge 30 along the track 31.

While specific embodiments of the invention have been shown and described in detail to illustrate the application of the principles of the invention, it will be understood that the invention may be embodied otherwise without departing from such principles.

List of Reference Characters 10 headrest
12 front cover
14 rear cover
16 rod
18 support rod locking interface
20 lever assembly
21 guide slot follower
22 lever
22L left lever
22R right lever
23 guide rails
24 bezel
25 slide tab
26 spring
27 bezel spring support
28 lever spring support
30 lever wedge
31 wedge guide track
32 paddle
32L left paddle
32R right paddle
33 paddle wedge
33L left paddle wedge
33R right paddle wedge
35 paddle pivot
40 release carrier
42 latch release element
50 pivot carrier
51 pivot joint connection
52 arm extension
53 pivot support
54 drive linkage end
55 pivot arm
70 carriage
72 rod receiving portion
74 cartridge
76 cartridge opening flange
82 locking/release element
86 forward/rearward release latch
88 catch surface region

What is claimed is:

1. A vehicle headrest comprising:
a carriage;
support rods connected to the carriage;
an outer headrest connected to the carriage;
a vertical locking arrangement connected to the carriage, the locking arrangement comprising:
a support rod locking interface on at least one of the support rods and a locking element moveable relative to the support rod locking interface between a locked position to provide a locked state and a release position to provide a released state;
a release lever accessible from an exterior of the headrest, the release lever moving with a lever release motion in a lever release direction essentially along a vehicle direction of travel;
a release carrier moving essentially along a vehicle inboard/outboard direction from a rest position to a release position and moving the locking element into the release position to provide the released state; and
a release linkage connecting the release lever to the locking interface and transmitting the lever release motion to the release carrier, whereby movement of the release lever in the lever release direction moves the release carrier in the vehicle inboard/outboard direction to the release position to release the locking element from the locking interface.

2. A vehicle headrest according to claim 1, wherein the release lever is a part of a release lever assembly comprising:
a lever guide; and
a lever biasing means for biasing the lever into a locked position, the lever being mounted to the lever guide for guided movement along the lever guide between the locked position and a lever release position.

3. A vehicle headrest according to claim 2, wherein the lever guide comprises a guide slot receiving a slot follower attached to the lever for guided movement of the slot follower between the locked position and the release position.

4. A vehicle headrest according to claim 1, wherein the lever guide comprises a pivot pivotably mounting the lever for pivoting movement of the lever between the locked position and a release position.

5. A vehicle headrest according to claim 1, wherein the release linkage comprises a pivotably mounted paddle acting on the release carrier in the vehicle inboard/outboard direction and a wedge arrangement between the lever and the paddle for transmitting motion of the lever in the lever release direction into motion of the paddle in the vehicle inboard/outboard direction.

6. A vehicle headrest according to claim 1, further comprising a headrest forward and rearward locking arrangement connected to the carriage, the locking arrangement comprising a latch connected to the carriage and having a locked state and a released state, wherein the carriage is movably mounted relative to the outer headrest and the latch is actuated by movement of the release carrier, whereby movement of the release lever in the lever release direction moves the release carrier in the inboard/outboard direction to the release position to move the latch from the locked state to the released state.

7. A vehicle headrest according to claim 6, wherein the carriage is movably mounted relative to the outer headrest in a forward and rearward direction that is linear or changes a tilt angle of the outer headrest.

8. A vehicle headrest according to claim 1, further comprising:
a second side release lever accessible from a second side of the exterior of the headrest, the second side release lever moving with a second lever release motion in a second lever release direction essentially along the vehicle direction of travel;
a second side release linkage comprising a pivotably mounted second side paddle moving in the vehicle inboard/outboard direction from a rest position to a release position and a second side wedge arrangement between the lever and the paddle for transmitting motion of the lever in the lever release direction into motion of the paddle in the vehicle inboard/outboard direction.

9. A vehicle headrest according to claim 8, wherein the second side release linkage further comprises a complementary mechanism connecting the second side paddle to the release carrier and transmitting the second side release lever release motion to the release carrier, whereby movement of the second side release lever in the second side lever release direction moves the release carrier in the vehicle inboard/ outboard direction to the release position to release the locking element from the locking interface and the movement of the release carrier to the release position is in a direction that is essentially opposite to the direction of movement of the second side paddle from the rest position to the release position.

10. A vehicle headrest according to claim 9, wherein the complementary mechanism comprises: an arm extension connected to the pivotably mounted second side paddle, the paddle acting on the arm extension in the vehicle inboard/outboard direction; a pivot carrier with a pivot support, the pivot carrier being connected to the carriage; a pivot arm; a pivot joint connecting the arm extension to the pivot arm, the pivot arm being pivotably mounted to the pivot support and having a drive linkage end connected to the release carrier, whereby the second release linkage connects the second release lever to the release carrier and transmits the second lever release motion to the release carrier, whereby movement of the second release lever along the direction of travel moves the release carrier in the inboard/outboard direction to release the locking element from the locking interface.

11. A vehicle headrest according to claim 8, further comprising a headrest forward and rearward locking arrangement connected to the carriage, the locking arrangement comprising a latch having a locked state and a released state, wherein the carriage is movably mounted relative to the outer headrest and the latch is connected to the release carrier whereby movement of the release lever along the direction of travel moves the release carrier in the inboard/outboard direction to release the latch to the released state.

12. A vehicle headrest according to claim 8, wherein the second side release lever is a part of a release lever assembly comprising:
a lever guide; and
a lever biasing means for biasing the lever into a locked position, the lever being mounted to the lever guide for guided movement along the lever guide between the locked position and a second lever release position.

13. A vehicle headrest according to claim 1, wherein the outer headrest comprises a headrest front cover connected to the carriage and a headrest rear cover connected to the carriage.

14. A vehicle headrest comprising:
a carriage;
support rods connected to the carriage;
an outer headrest connected to the carriage;
a vertical locking/release arrangement connected to the carriage, the vertical locking/release arrangement comprising:
a support rod locking interface and a locking element having a locked state and a released state;
a first side release lever accessible from a first side of an exterior of the headrest, the first side release lever moving with a first side lever release motion in a first lever release direction that is essentially a headrest forward or rearward direction;
a release carrier with a carrier release motion essentially in a headrest lateral direction, essentially corresponding to a vehicle inboard or outboard direction, and moving the locking element between a locked position providing a locked state and a release position providing a released state;
a first side release linkage connecting the first side release lever to the locking interface and transmitting the first side lever release motion to the carrier release motion of the release carrier from a carrier rest position to a carrier release position, to release the locking element from the locking interface;
a second side release lever accessible from a second side of an exterior of the headrest, the second side release lever moving with a second side lever release motion that is essentially in the headrest forward or rearward direction;
a second side release linkage connecting the first side release lever to the locking interface and transmitting the second side lever release motion to the carrier release motion of the release carrier from the carrier rest position to the carrier release position, to release the locking element from the locking interface.

15. A vehicle headrest according to claim 14, wherein the first side release linkage comprises a pivotably mounted first side paddle acting on the release carrier essentially along the headrest lateral direction to cause the carrier release motion of the release carrier, from the carrier rest position to the carrier release position, to release the locking element from the locking interface and a wedge arrangement between the lever and the paddle for transmitting motion of the first side lever, in the lever release direction, into motion of the first side paddle, with a movement component essentially in the headrest lateral direction from, a rest position to a release position.

16. A vehicle headrest according to claim 15, wherein the second side release linkage comprises a pivotably mounted second side paddle and a second side wedge arrangement between the second side lever and the second side paddle for transmitting motion of the second side lever, in the second lever release direction, into motion of the second side paddle, with a movement component essentially in the headrest lateral direction from, a rest position to a release position.

17. A vehicle headrest according to claim 16, wherein the second side release linkage further comprises a complementary mechanism connecting the second side paddle to the release carrier, with the second side paddle acting on the complementary mechanism essentially along the headrest lateral direction, and the complementary mechanism transmitting a release motion of the second side release lever to the release carrier to cause the carrier release motion of the release carrier, from the carrier rest position to the carrier release position, to release the locking element from the locking interface, whereby the carrier release motion is in a direction that is essentially opposite to the direction of the movement component, essentially in the headrest lateral direction, of the second side paddle.

18. A vehicle headrest according to claim 17, wherein the complementary mechanism comprises: an arm extension connected to the pivotably mounted second side paddle, the paddle acting on the arm extension in the headrest lateral direction; a pivot carrier with a pivot support, the pivot carrier being connected to the carriage; a pivot arm; a pivot joint connecting the arm extension to the pivot arm, the pivot arm being pivotably mounted to the pivot support and having a drive linkage end connected to the release carrier, whereby the second release linkage connects the second release lever to the release carrier and transmits the second lever release motion to the release carrier, whereby movement of the second release lever with the second side lever release motion that is essentially in the headrest forward or rearward direction moves the release carrier in the headrest lateral direction to release the locking element from the locking interface.

19. A vehicle headrest according to claim 18, further comprising a forward and rearward locking arrangement connected to the carriage, the locking arrangement comprising a latch having a locked state and a released state, wherein:
- the carriage is movably mounted relative to the outer headrest; and
- the latch is connected to the release carrier whereby first side lever release motion or the second side lever release motion moves the pivot carrier in the headrest lateral direction to release the latch to the released state to allow a movement of the outer headrest relative to the carriage with a forward or rearward component of movement.

20. A vehicle headrest according to claim 19, wherein:
- the first side paddle is connected to the release carrier so as to allow movement of the outer housing relative to the release carrier, with the forward or rearward component of movement, without interrupting the action of the first side paddle on the release carrier essentially along the headrest lateral direction; and
- the second side paddle is connected to the complementary mechanism so as to allow movement of the outer housing relative to the complementary mechanism, with the forward or rearward component of movement, without interrupting the action of the second side paddle on the complementary mechanism essentially along the headrest lateral direction.

* * * * *